US010311652B2

(12) United States Patent
Stefan et al.

(10) Patent No.: US 10,311,652 B2
(45) Date of Patent: Jun. 4, 2019

(54) METHOD AND DEVICE FOR MODIFYING THE CONFIGURATION OF A DRIVING ASSISTANCE SYSTEM OF A MOTOR VEHICLE

(71) Applicant: Ford Global Technologies, LLC, Dearborn, MI (US)

(72) Inventors: Frederic Stefan, Aachen (DE); Uwe Gussen, Huertgenwald (DE); Thomas Rambow, Aachen (DE); Christoph Arndt, Moerlen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 15/292,268

(22) Filed: Oct. 13, 2016

(65) Prior Publication Data

US 2017/0032590 A1    Feb. 2, 2017

Related U.S. Application Data

(62) Division of application No. 14/254,625, filed on Apr. 16, 2014, now Pat. No. 9,483,882.

(30) Foreign Application Priority Data

Apr. 16, 2013    (DE) .......................... 10 2013 206 746

(51) Int. Cl.
*G07C 5/00*    (2006.01)
*G07C 5/08*    (2006.01)
(Continued)

(52) U.S. Cl.
CPC ............. *G07C 5/008* (2013.01); *B60W 50/08* (2013.01); *B60W 50/10* (2013.01);
(Continued)

(58) Field of Classification Search
CPC ..... G07C 5/008; G07C 5/0841; B60W 50/08; B60W 50/10; B60W 2710/20; B60W 2550/12
(Continued)

(56) References Cited

U.S. PATENT DOCUMENTS 5,442,553 A    8/1995    Parrillo
6,975,612 B1    12/2005    Razavi et al.
(Continued)

FOREIGN PATENT DOCUMENTS

DE    59501130 T2    3/1998
DE    10115315 A1    10/2001

OTHER PUBLICATIONS

German Patent and Trademark Office, Office Action for the corresponding German Patent Application No. DE 10 2013 206 746.1 dated Oct. 28, 2015.
https://www.extremetech.com/extreme/125621-mercedes-benz-over-the-air-car-updates#disqus_thread.

*Primary Examiner* — Nga X Nguyen
(74) *Attorney, Agent, or Firm* — Frank MacKenzie; Brooks Kushman P.C.

(57) ABSTRACT

A method for updating a driving assistance system of a motor vehicle includes operating a central communications platform to receive data transmitted wirelessly from the vehicle, the data logged onboard the vehicle during operation of the driving assistance system and relating to driving conditions existing when a driver of the vehicle makes a control input that is counter to vehicle control directed by the driving assistance system. The method may include determining a modified configuration for the driving assistance system based on the data, and transmitting the modified configuration from the central communications platform to
(Continued)

the driving assistance system, the modified configuration being used to update decision logic of the driving assistance system.

16 Claims, 3 Drawing Sheets

(51) Int. Cl.
    *B60W 50/08*     (2012.01)
    *B60W 50/10*     (2012.01)

(52) U.S. Cl.
    CPC ....... *G07C 5/0841* (2013.01); *B60W 2550/12* (2013.01); *B60W 2710/20* (2013.01)

(58) Field of Classification Search
    USPC .................................. 340/905; 701/2, 36, 48
    See application file for complete search history.

(56) References Cited

U.S. PATENT DOCUMENTS

| | | |
|---|---|---|
| 7,162,339 B2 | 1/2007 | Nguyen |
| 7,196,612 B2 | 3/2007 | Sumada et al. |
| 7,979,173 B2 | 7/2011 | Breed |
| 8,126,642 B2 | 2/2012 | Trepagnier et al. |
| 8,762,044 B2 | 6/2014 | Kelly et al. |
| 9,031,713 B2 | 5/2015 | Nordbruch et al. |
| 2007/0135989 A1 | 6/2007 | Hengst |
| 2011/0125344 A1 | 5/2011 | An et al. |
| 2011/0210867 A1* | 9/2011 | Benedikt .................. G08G 1/01 340/905 |
| 2012/0083960 A1 | 4/2012 | Zhu et al. |
| 2014/0005880 A1 | 1/2014 | Guenkova-Luy et al. |
| 2014/0145861 A1* | 5/2014 | Goudy ............... G08G 1/09626 340/905 |

* cited by examiner

METHOD AND DEVICE FOR MODIFYING THE CONFIGURATION OF A DRIVING ASSISTANCE SYSTEM OF A MOTOR VEHICLE

CROSS-REFERENCE TO RELATED APPLICATIONS

This application is a divisional of U.S. application Ser. No. 14/254,625 filed Apr. 16, 2014, which claims foreign priority benefits under 35 U.S.C. § 119(a)-(d) to DE 10 2013 206 746.1 filed Apr. 16, 2013, which is hereby incorporated by reference in its entirety.

TECHNICAL FIELD

The invention relates to a method and a device for modifying the configuration of a driving assistance system of a motor vehicle. The invention can be implemented in conjunction with any driving assistance system that is able to assume partial or complete control over the guidance or control of a motor vehicle in a transverse and/or a longitudinal direction.

BACKGROUND

Driving assistance systems are increasingly being equipped with the ability to guide motor vehicles in a longitudinal and a transverse direction. This results in an ever greater capability of motor vehicles for autonomous or unassisted driving. A goal of autonomous driving systems is to develop autopilots in motor vehicles to the point where such autopilots are capable of handling a wide range of unexpected events as well as a human driver is able to. The practically unlimited number of situations that may arise in real life over the entire period of use of a motor vehicle makes it impossible to foresee every possible situation.

U.S. Pat. No. 7,162,339 B2 discloses, inter alia, a method and a device for automatically updating the calibration parameters in a motor vehicle, wherein a remotely controlled data-calibration system is configured to acquire operational data from motor vehicles via a telecommunications interface, and to generate updated vehicle calibration parameters based on the analysis of the acquired operational data, and to transmit these parameters to a computing platform via the telecommunications interface, wherein said operational data from the motor vehicle is generated by sensors inside the motor vehicle that detect visible and audible activities inside the motor vehicle.

An object of the present invention is to provide a method and a device for modifying the configuration of a driving assistance system of a motor vehicle that enable improved automatic guidance or control of a motor vehicle in particular in the event of unforeseen or critical situations.

SUMMARY

In a first disclosed embodiment, a method for modifying the configuration of a driving assistance system of a motor vehicle comprises operating a central communications platform to receive data transmitted wirelessly from the vehicle, the data logged onboard the vehicle during operation of the driving assistance system and relating to driving conditions existing when a driver of the vehicle makes a control input that is counter to vehicle control directed by the driving assistance system. A modified configuration for the driving assistance system is determined based on the data; and the modified configuration is transmitted from the central communications platform to the driving assistance system. The modified configuration is used to update decision logic of the driving assistance system. The modified configuration causes the driving assistance system to automatically controls the vehicle in a manner consistent with the control input if the driving conditions reoccur.

In another disclosed embodiment, the modified configuration is further transmitted from the central communications platform to a driving assistance system of one or more other motor vehicles. The other motor vehicle may be selected based on vehicle model and/or fitted equipment.

In another disclosed embodiment, a method for operating a driving assistance system of a motor vehicle comprises, during operation of the driving assistance system, detecting that a driver of the vehicle makes a control input that is counter to vehicle control directed by the driving assistance system, logging data relating to driving conditions existing when the driver makes the control input, transmitting the data to a central communications platform, and receiving from the central communications platform a modified configuration for the driving assistance system. The modified configuration created by the central communications platform is based on the data and is loaded into the driving assistance system.

In another disclosed embodiment, apparatus for a motor vehicle comprises a driving assistance system operable to automatically control the vehicle, an acquisition system collecting data from at least one vehicle system, the data relating to driving conditions existing when a driver of the vehicle makes a control input counter to automatic vehicle control directed by the driving assistance system, and a wireless communication unit transmitting the data to a central communications platform and receiving from the central communications platform a modified configuration for the driving assistance system. The modified configuration is created by the central communications platform based upon the data and is loaded into the driving assistance system.

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

Figure 1:
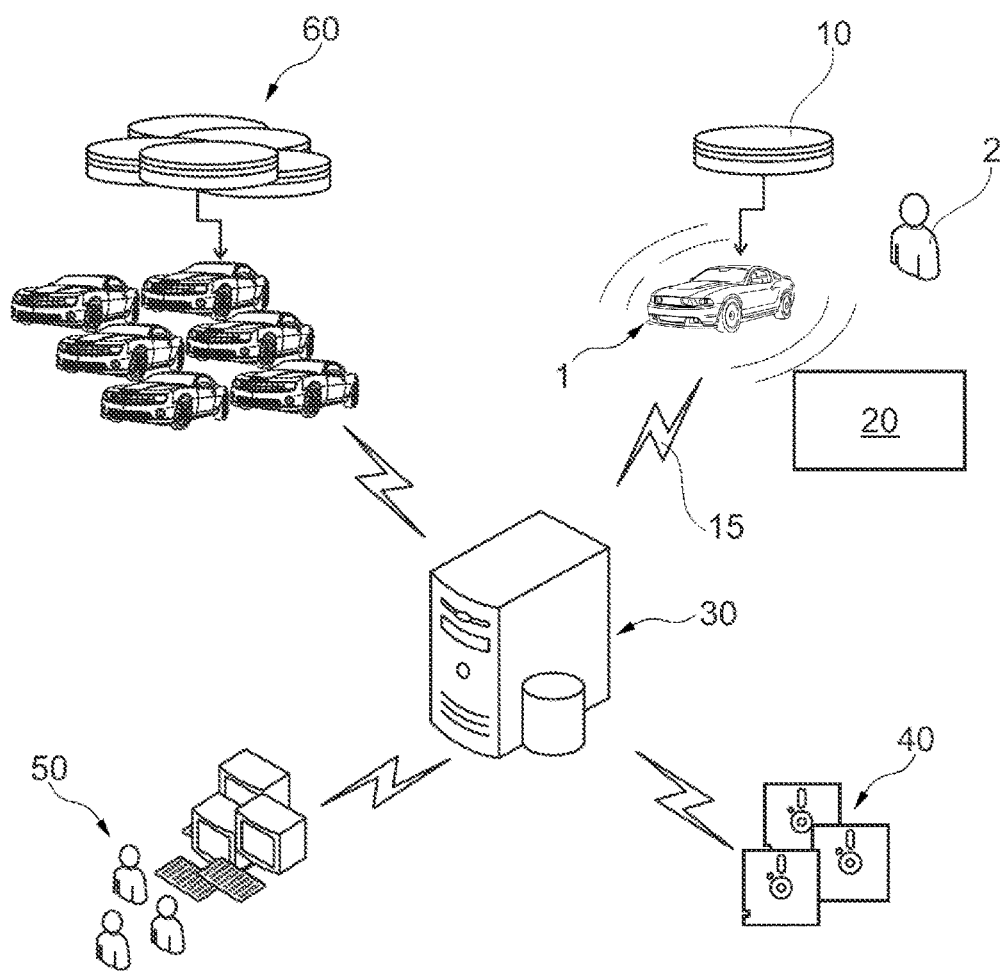
FIGS. 1 and 2 show schematic diagrams for the purpose of explaining the design and manner of operation of a device according to the invention in a representative embodiment.

FIG. 1 is a schematic diagram illustrating a motor vehicle 1 that is equipped with a driving assistance system 10 in the form of an autopilot. The driver of the motor vehicle 1 is also shown and denoted by reference numeral 2.

Figure 2:
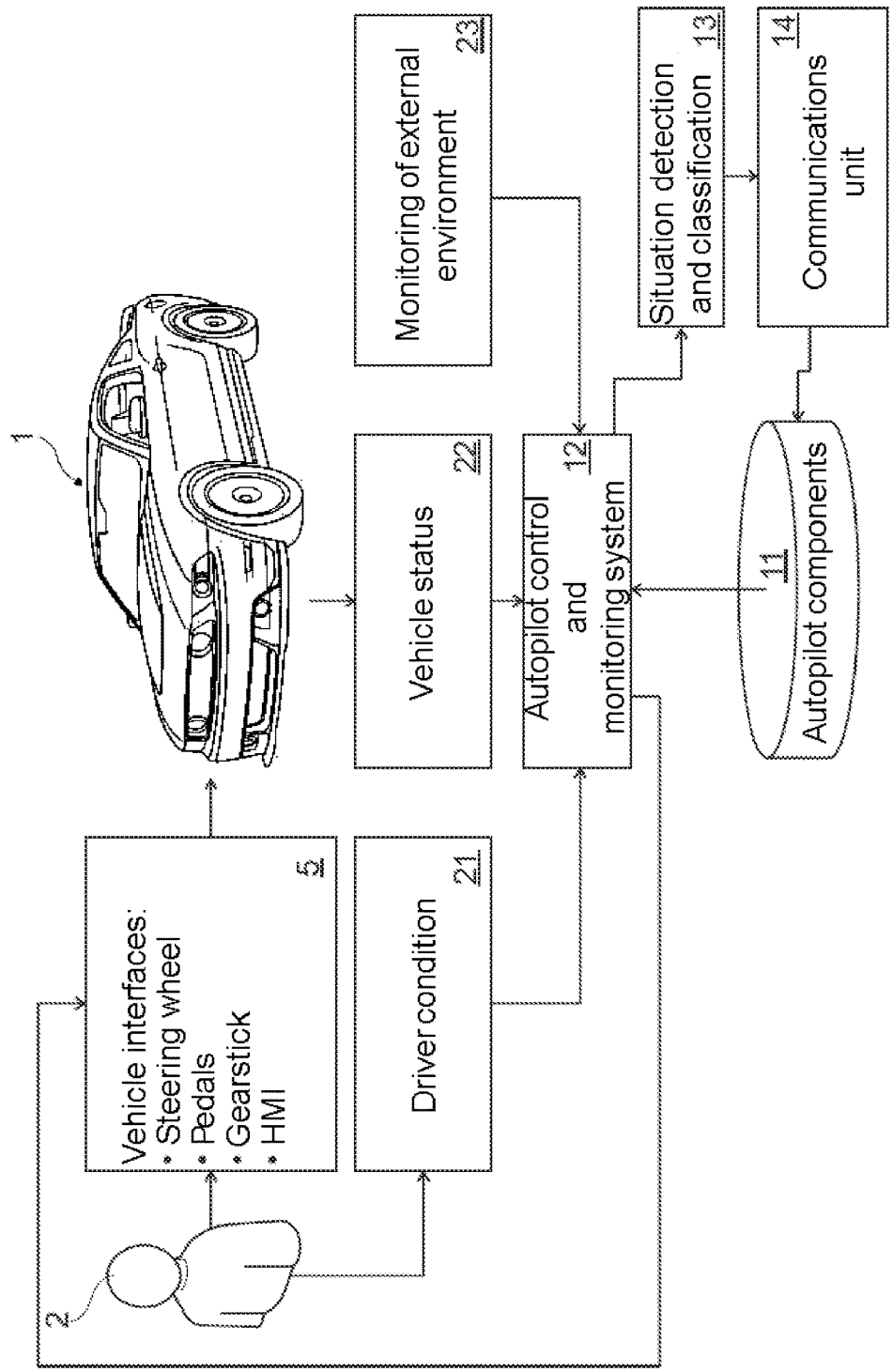

An acquisition system 20, which is described in greater detail below with reference to FIG. 2, is used to retrieve data relating to the driver condition, the external environment, the vehicle status and, if applicable, the response of other road users and the response of the driving assistance system 10 in a specific driving situation. The relevant driving situation can also be classified on the basis of these parameters. Reference numeral 15 denotes bidirectional wireless communication with a central communications platform 30. This central communications platform 30 is configured to receive and store data transmitted from the motor vehicle 1 relating to the particular driving situation and associated (e.g. non-optimum) responses of the driving assistance system 10 to this driving situation.

Then the data stored in the central communications platform 30 is automatically analyzed, for example by software 40 indicated by data storage media, in which analysis an appropriate modified configuration of the driving assistance system 10 or a suitable software update is generated e.g. by using training algorithms. The data stored in the communications platform 30 and relating to the particular driving situation, and the recommendation generated by the software 40, can also be analyzed additionally by personnel (also shown in FIG. 1 and denoted by reference numeral 50) or also by suitable intelligent programs.

As additionally shown in FIG. 1, the generated appropriate software update or the modified configuration of the driving assistance system can be downloaded to one or more other motor vehicles equipped with a suitable driving assistance system 60. In this process, the software updated in each case in the exemplary embodiment relates to the decision logic of the driving assistance system 60 (i.e. the steps to be performed by the driving assistance system 60 in a given driving situation). The particular update is preferably performed while the motor vehicle concerned is in the parked state, wherein the respective driver can, for instance, transmit a request to stop the motor vehicle of said driver at the next opportunity so that the update process can be performed. In embodiments of the invention, the appropriate update can also pass through a validation phase.

FIG. 2 shows a diagram for describing in greater detail the manner of operation of the acquisition system 20 and how it interacts with the motor vehicle 1, the driving assistance system 10 and the driver 2. A control and monitoring system 12 receives, in specific (e.g. critical) driving situations, data 21 relating to the driver condition, data 22 relating to the vehicle status, data 23 relating to the external environment, and data relating to the behavior and the response of components 11 of the driving assistance system 10, and transmits this data to a unit 13 for situation detection and classification. This unit 13 for situation detection and classification is used to receive and to classify the data collected by the control and monitoring system 12 for (e.g. serious) driving situations, wherein e.g. the data can be classified according to the following model: "a=unfamiliar driving situation, b=critical response of the driver, c=critical response of the vehicle behind, d=accident, etc.". The results of the situation detection and classification are transmitted to the communications unit 14.

The communications unit 14 is used to coordinate wireless communication between the motor vehicle 1 and a remotely located central unit (e.g. a server), in particular for instance the central communications platform 30 of FIG. 1. In addition, the communications unit 14 enables the driving assistance system 10 to send specific information and can receive an appropriate software update for the driving assistance system 10.

Figure 3:
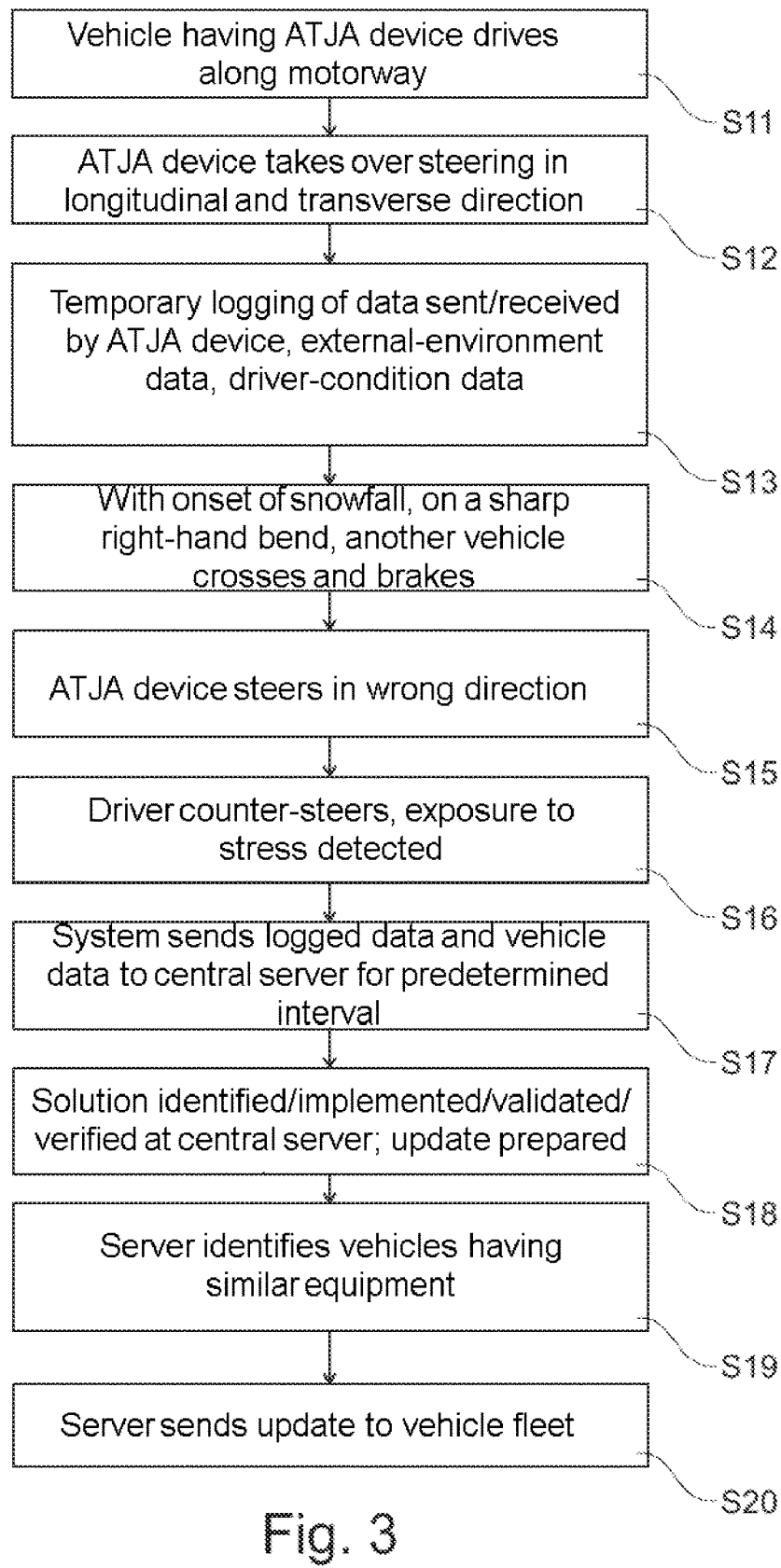
FIG. 3 shows a flow chart for the purpose of explaining a typical process flow for a system or method according to various embodiments.

An exemplary embodiment is used below to describe with reference to the flow chart shown in FIG. 3 an example of operation of the disclosed device, in other words a typical flow process for the method according to the invention.

This example assumes that a motor vehicle is equipped with an ATJA device (ATJA="Advanced Traffic Jam Assist"), and this ATJA device is activated by the driver during a motorway journey (step S11). It is assumed below that at a certain point in time, the ATJA device takes over the guidance or control of the motor vehicle in at least one of a longitudinal and a transverse direction (S12).

From which point, in a step S13, all the data that is received and output by the ATJA device is logged temporarily by the disclosed device, wherein this data may be e.g. sensor input data, CAN signals, internal states etc. In addition, the disclosed device temporarily logs all the data that contains information relating to the external environment, wherein this data may be e.g. video data from a LIDAR sensor, navigation data, infrastructure data, the position of the vehicle in the lane, weather data, visibility etc. In addition, the disclosed device also temporarily logs all the data that contains information about the condition of the driver, wherein this data may be, for instance, pedal actuation, steering-wheel actuation, exposure to stress, eye movements, voice data, heartbeat etc.

It is now assumed that it starts to snow. In a sharp right-hand bend on which the motor vehicle is moving in the right-hand lane, another motor vehicle enters the lane concerned, starts to skid and brakes suddenly (S14). The ATJA device thereupon steers the motor vehicle in the wrong direction (S15), because this motor vehicle follows the other motor vehicle that has started to skid, and in particular for some reason does not brake and also does not output any warning to the driver. The driver is consequently forced to steer counter to the ATJA device in order to correct the incorrect path of movement of the motor vehicle and to perform an emergency stop. In this situation, the driver is exposed to an extreme level of stress, which is manifested in particular in a raised heartbeat, widened eyes, open mouth, calling out and abrupt gestures. The disclosed device detects both the situation exposing the driver to stress and the unexpected disabling or bypassing of the ATJA device (S16).

The disclosed device sends all the data recorded in the steps described above for a predetermined time interval either side of the relevant driving situation (e.g. 90 seconds before and after the braking) to a central communications platform 30 or a central server (step S17). In addition, the disclosed device also sends vehicle-related data (vehicle model, engine type, equipment features) to the central server. The set of data is subsequently analyzed at the central server. This step can be performed either by development personnel or, if applicable, also by intelligent programs. In the next step, a solution to the problem that has occurred is identified, implemented, validated and verified, in which process an appropriate update is created (S18).

The central server then identifies all the motor vehicles that are equipped with an ATJA device and that furthermore also have similar features to the motor vehicle affected by the driving situation described above (S19). If applicable, other vehicle models or vehicle classes can be included as well. Then the central server sends the software or the updated solution to the entire vehicle fleet of the previously identified vehicles (S20). Thus, as a result, the reoccurrence of the critical driving situation described above is prevented in all the vehicles that receive the update.

In addition to transmitting the relevant data to the central communications platform, information entered by the driver can also be transmitted to the central communications platform. In particular, in embodiments of the invention, the driver can in turn submit comments or suggestions for improvements e.g. by voice-assisted means or by HMI ("Human Machine Interface"), which are then transmitted to the communications platform.

The present invention is based on the concept of improving the guidance or control of a motor vehicle by a driving assistance system by identifying critical situations (e.g. situations that induce stress for the driver of the motor vehicle) in which the driver unexpectedly takes over steering of the motor vehicle and thereby disables the driving assistance system, whereupon the data recorded or logged in the motor vehicle during such critical driving situations (e.g. sensor data, conditions in the external environment or CAN signals) is sent to a central communications platform. The data is then analyzed e.g. in the central communications platform in order to determine a solution (in the form of a modified configuration of the driving assistance system, for instance by performing an appropriate software update) that can be used to avoid in future the relevant critical driving situation. When an applicable solution exists, this modified configuration is sent by remote control to the relevant motor vehicle to replace the previous or currently available configuration or software.

According to one embodiment, the modified configuration for the driving assistance system is created such that when the detected driving situation reoccurs, the driving assistance system automatically guides or controls the motor vehicle in a modified manner. Hence the method according to the invention can be used to configure a driving assistance system (e.g. an autopilot mechanism for autonomous driving of the motor vehicle) continuously to be ever more robust and reliable.

According to one embodiment, the modified configuration is transmitted from the central communications platform to driving assistance systems of a plurality of motor vehicles. These motor vehicles may be, for instance, all the motor vehicles that may be exposed to a similar critical driving situation. The relevant motor vehicles that are included in the transmission of the modified configuration from the central communications platform can be selected in advance on the basis of model and/or fitted equipment.

Hence the optimum behavior pattern in particular of an entire vehicle fleet can benefit from the "training gain" achieved according to the invention. Thus, in particular, this creates the opportunity of making available the training gain obtained from critical driving situations (even driving situations having a tragic outcome) to a multiplicity of (e.g. several hundred) other vehicles that are equipped with the same system. The invention therefore also enables a reduction in the number of recall actions for driving assistance systems or autopilots by transmitting appropriate software updates to the relevant motor vehicles. In addition, the training gain achieved can also be taken into account in design and development phases of future projects.

The data that is logged after the step of detecting the relevant (e.g. critical) driving situation can include data that describes the condition of the driver and/or an activity of the driver, data that describes the external environment of the vehicle and also data that describes the operating status of the motor vehicle.

The invention also relates to a device for modifying the configuration of a driving assistance system of a motor vehicle, which device is designed to implement a method having the features described above. Reference is made to the aforementioned embodiments in conjunction with the method according to the invention with regard to preferred embodiments and advantages of the device.

Thus the invention provides a communications platform for a driving assistance device or a mechanism for automatic or autonomous driving of a motor vehicle, which platform is capable of identifying critical, unexpected or unfamiliar driving situations and implementing a solution for such driving situations that is then transmitted automatically to the relevant motor vehicle or the driving assistance system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
receiving data transmitted wirelessly from a vehicle at a central communications platform (CCP), the data logged onboard the vehicle during operation of a driving assistance system (DAS) and relating to driving conditions when a driver makes a control input counter to control directed by the DAS;
transmitting a modified configuration based on the data from the CCP to the DAS for updating decision logic of the DAS using the modified configuration; and
transmitting the modified configuration from the CCP to a DAS of a second vehicle that is selected based on vehicle model and/or fitted equipment matching a vehicle model and/or fitted equipment of the vehicle.

2. The method of claim 1, wherein the modified configuration causes the DAS to automatically control the vehicle in a manner consistent with the control input when the driving conditions reoccur.

3. The method of claim 1, wherein the driving conditions relate to at least one of a physical condition of the driver, an activity of the driver, an external environment of the vehicle, an operating status of the vehicle, and a response of the DAS.

4. The method of claim 1, wherein the data received by the CCP includes data logged over a time interval beginning before the control input and ending after the control input.

5. The method of claim 1, further comprising operating the CCP to receive information entered by the driver.

6. The method of claim 1, wherein the control input made by the driver is a steering input.

7. The method of claim 1, wherein the DAS is operable to control the vehicle in a longitudinal direction and a lateral direction.

8. A system comprising:
a central communications platform (CCP) configured to receive data transmitted from a vehicle, the data logged onboard the vehicle during operation of a driving assistance system (DAS) and relating to driving conditions when a driver makes a control input different than a control directed by the DAS, the CCP wirelessly transmitting a modified configuration to the DAS based on the data to update decision logic of the DAS using the modified configuration, wherein the CCP transmits the modified configuration to a DAS of a second vehicle that is selected based on vehicle model and/or fitted equipment matching a vehicle model and/or fitted equipment of the vehicle.

9. The system of claim 8 wherein the CCP transmits a modified configuration that causes the DAS to automatically control the vehicle in a manner consistent with the control input when the driving conditions reoccur.

10. The system of claim 8 wherein the driving conditions relate to at least one of a physical condition of the driver, an activity of the driver, an external environment of the vehicle, an operating status of the vehicle, and a response of the DAS.

11. The system of claim 8 wherein the data received by the CCP includes data logged over a time interval beginning before the control input and ending after the control input.

12. The system of claim 8 wherein the data received by the CCP includes information entered by the driver.

13. The system of claim 8 wherein the control input made by the driver is a steering input.

14. A system comprising:
a central communications platform (CCP) configured to wirelessly receive data logged onboard a vehicle during operation of a driving assistance system (DAS) relating to driving conditions logged in response to a driver controlling the vehicle differently than directed by the DAS, and wirelessly transmit a modified configuration based on the data to the vehicle to update decision logic of the DAS using the modified configuration, wherein the CCP transmits the modified configuration to a DAS of a second vehicle that is selected based on vehicle model and/or fitted equipment matching a vehicle model and/or fitted equipment of the vehicle.

15. The system of claim 14 wherein the driving conditions relate to at least one of an activity of the driver and an operating status of the vehicle.

16. The system of claim 14 wherein the data includes data logged over a time interval surrounding a time when the driver controls the vehicle differently than directed by the DAS.

* * * * *